(12) United States Patent
Papenfuhs et al.

(10) Patent No.: US 7,511,096 B2
(45) Date of Patent: Mar. 31, 2009

(54) CROSSLINKED POLYVINYL ACETALS

(75) Inventors: Bernd Papenfuhs, Obertshausen (DE);
Martin Steuer, Liederbach (DE);
Matthias Gutweiler, Hünfelden (DE)

(73) Assignee: Kuraray Europe GmbH, Frankfurt (DE)

( * ) Notice: Subject to any disclaimer, the term of this patent is extended or adjusted under 35 U.S.C. 154(b) by 655 days.

(21) Appl. No.: 10/542,019

(22) PCT Filed: Dec. 12, 2003

(86) PCT No.: PCT/EP03/14109

§ 371 (c)(1),
(2), (4) Date: Jul. 11, 2005

(87) PCT Pub. No.: WO2004/063231

PCT Pub. Date: Jul. 29, 2004

(65) Prior Publication Data

US 2006/0052533 A1   Mar. 9, 2006

(30) Foreign Application Priority Data

Jan. 9, 2003   (DE) ............................... 103 00 321
Apr. 29, 2003  (DE) ............................... 103 19 201

(51) Int. Cl.
*C08F 8/00* (2006.01)
(52) U.S. Cl. ............... 525/61; 525/56; 526/61; 526/62
(58) Field of Classification Search ............ 525/56, 525/61; 526/62, 61
See application file for complete search history.

(56) References Cited

U.S. PATENT DOCUMENTS

| | | | |
|---|---|---|---|
| 2,187,570 A | | 1/1940 | Kränzlein |
| 2,332,889 A | * | 10/1943 | Bouvet et al. ............... 242/131 |
| 4,306,031 A | | 12/1981 | Itagaki et al. |
| 4,814,529 A | | 3/1989 | Cartier et al. |
| 5,332,774 A | | 7/1994 | Klang |
| 6,808,858 B2 | * | 10/2004 | Fuss et al. ............... 430/157 |

FOREIGN PATENT DOCUMENTS

| | | |
|---|---|---|
| EP | 0024055 | 2/1981 |
| EP | 0211818 | 2/1987 |
| EP | 0393190 | 10/1990 |

* cited by examiner

*Primary Examiner*—Randy Gulakowski
*Assistant Examiner*—Michael M Bernshteyn
(74) *Attorney, Agent, or Firm*—Mullen, White, Zelano, Branigan, P.C.

(57) ABSTRACT

The invention relates to methods for producing crosslinked polyvinyl acetals, according to which a polyvinyl alcohol (A1) containing carboxyl groups is crosslinked by (i) reacting the polymer (A1) with at least one polyaldehyde of formula $R^9(CHO)_n$, and (ii) at least partly esterifying groups of formula (1) and formula (4a) with each other, said steps being performed in any order. The invention further relates to methods for producing crosslinked polyvinyl acetals, according to which a polyvinyl alcohol (A2) is crosslinked by (i) reacting the polymer (A2) with at least one compound of formula (6), (ii) adding at least one compound of formula (4b), (iii) adding a polyaldehyde of formula (5), and (iv) at least partly esterifying groups of formula (1) and structural units derived from the compound of formula (4b) with each other, the radicals $R^7$, $R^8$, $R^9$, $R^{10}$, and $R^{11}$, and the index n being defined as indicated in the description. Also disclosed are the crosslinked polyvinyl acetals obtained by means of the inventive method and particularly appropriate areas of application of said polymers.

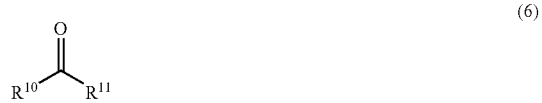

(6)

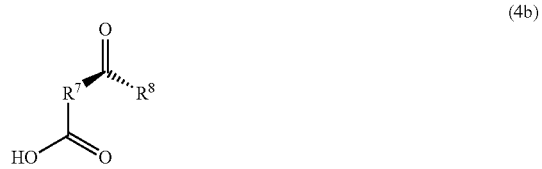

(4b)

38 Claims, No Drawings

CROSSLINKED POLYVINYL ACETALS

The present invention relates to cross-linked polyvinylcetals, methods for their preparation as well as their use, especially for laminated safety glasses.

The modification of polyvinylalcohol by means of acetylization, especially with n-butyraldehyde, is a long-known and used reaction. Films of polyvinylacetal obtained in this way, especially polyvinylbutyral, are because of their resistance to light as well as their very good adhesive capability employed as intermediate layers in laminated safety glasses, especially in automobile panes (front and side panes). This type of laminated glass offers a high degree of safety since in the event of impact stress the elastic polyvinylacetal film absorbs the mechanical energy and should the occasion arise glass splinters remain adhered to the film.

Unfortunately however laminated safety glasses based on conventional polyvinylcetal types frequently have insufficient mechanical properties, especially at higher temperatures above 150° C. This problem is only partially solved by use of polyvinylacetals with higher molecular weights, since at this point among others, based on processing problems (e.g. blister formation, too high or too low polyvinylcetal viscosity at the working temperature, lack of constancy in properties during the processing) impacts practical feasibility mostly at the boundaries.

On this basis European Patent Application 211 818 suggests the utilization of polyvinylbutyral which by use of aldehydes having at least two aldehyde groups cross-linked via intermolecular diacetal linkages are cross-linked with the butyraldehyde before or during the acetylization reaction of polyvinylalcohol. Due to the very high reactivity of aldehydes this type of cross-linking leads however to strong cross-linking, very high molecular weights and therefore partially insoluble polyvinylbutyrals, which have only limited—if any—suitability for the manufacture of high quality laminated safety glasses. Independently of that the polyvinylbutyrals cross-linked through di- or polyaldehydes under the conditions of thermoplastic processing of polymers (e.g. extrusion) are not sufficiently stable which is why, depending on the applied temperatures, dwell times, shear rates etc. a more or less strongly pronounced splitting of the cross-linking points (molecular weight breakdown) takes lace. This lack of thermal stability especially complicates the manufacture of reproducible product qualities, since the polymer reacts extremely sensitively to process fluctuations, and results moreover in a worsening of the mechanical properties of the polyvinylacetals especially at high temperatures.

In consideration of this state of the art therefore it was an object of the present invention to provide polyvinylacetals with improved mechanical properties, especially at higher temperatures, preferably above 150° C. In this context in accordance with the invention the polyvinylacetals should be suitable for the manufacture of films as well as especially the manufacture of laminated safety glasses of higher quality, and based on this preferably have a better constancy of the material properties, especially mechanical properties, in processing to films and to laminated safety glasses.

The present invention had the basic object to specify a method for the manufacture of polyvinylacetals in accordance with the invention of a simple type and way, which can be carried out cost-effectively on a large scale.

A further object of the invention was to identify and demonstrate particularly suitable application areas for the polyvinylcetals in accordance with the invention.

These, as well as other not explicitly stated objects, are solved, which however may be inferred or deduced without need for further discussion from the interrelationships discussed herein, through cross-linked polyvinylacetals, which are obtainable by means of a manufacturing method with all features of the present Patent Claim 1 or 5. Appropriate modifications of the method in accordance with the invention are protected in the dependent claims related to Claim 1 and/or 5. Furthermore the polyvinylcetals obtainable by means of the method in accordance with the invention, as well as for the application of specially interesting claimed application designs and application areas.

Thus that one includes a first method for preparation of cross-linked polyvinylcetals, in which the polymer (A1), relative to its total weight, contains (a) 1.0 to 99.9 wt % structural units of formula (1)

wherein $R^1$ represents hydrogen or methyl (b) 0 to 99.0 wt % structural units of formula (2)

wherein $R^2$ represents hydrogen or an alkyl group with 1 to 6 carbon atoms, (c) 0 to 70.0 wt % of structural units of formula (3)

wherein $R^3$, $R^4$, $R^5$ and $R^6$, are in each case groups independent of each other with a molecular weight in the range from 1 to 500 g/mol, (d) 0.00001 to 30.0 wt % structural units of formula (4a)

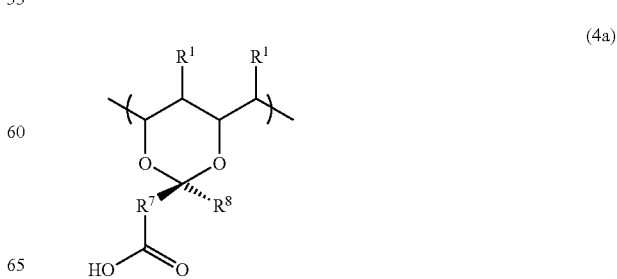

wherein $R^7$ is a linkage, an alkylene group with 1 to 10 carbon atoms or an if necessary substituted arylene group with 6 to 12 carbon atoms and $R^8$ is hydrogen, COOH, an alkyl group with 1 to 10 carbon atoms or an if necessary substituted aryl group with 6 to 12 carbon atoms, wherein one in any sequence,
(i) reacts polymer (A1) with at least one polyaldehyde of formula (5),

(5)

wherein $R^9$ represents a linkage or a group having 1 to 40 carbon atoms and n is a whole number greater than 2, and
(ii) at least partially, groups of formula (1) and formula (4a) esterified with each other, and a second method for manufacture of cross-linked polyacetals provided in which a polymer (A2) is cross-linked, which relative to its total weight, contains
(a) 1.0 to 99.9 wt % structural units of formula (1)
(b) 0 to 99.0 wt % structural units of formula (2)
(c) 0 to 70.0 wt % of structural units of formula (3)

wherein one
(i) reacts the polymer (A2) with at least one compound of formula (6)

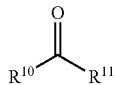

(6)

wherein $R^{10}$ and $R^{11}$, in each case independent of each other, are hydrogen, an alkyl group with 1 to 10 carbon atoms or an if necessary substituted aryl group with 6 to 12 carbon atoms,
(ii) adds at least one compound of formula (4b),

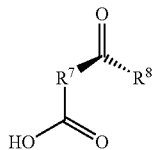

(4b)

wherein $R^7$ is a linkage, an alkylene group with 1 to 10 carbon atoms or an if necessary substituted arylene group with 6 to 12 carbon atoms and $R^8$ is hydrogen, COOH, an alkyl group with 1 to 10 carbon atoms or an if necessary substituted aryl group with 6 to 12 carbon atoms,
(iii) adds a polyaldehyde of given formula (5), and
(iv) esterifies at least partially groups of formula (1) and structural units derived from the compound of formula (4b) with each other, It succeeds with no further ado to make cross-linked polyvinylacetals in a predictable way, which in particular have improved mechanical properties at high temperatures preferably above 150° C., and above all have a better memory.

At the same time the cross-linked polyacetals in accordance with the invention have a series of other advantages. Belonging here amongst others are:
The polyacetals in accordance with the invention are distinguished by an improved constancy of material properties, such as for example their memory. This advantage is especially observed at temperatures higher than 150° C. A change in cross-linking density as in European Patent 211 818 can within the scope of the present invention not be observed, on the contrary the poyvinylacetals in accordance with the invention also have a significantly improved constancy of their cross-linking density at temperatures above 150° C.

The presence of the polymer-bound carboxyl or carboxylate groups in the polymers in accordance with the invention leads to a distinct stabilization of the junction points developed via acetal cross-links. Moreover they fulfill a buffer function and in this way possibly have harmful acid-effects for example by hydrolysis products effective toward anti-adhesive agents.

The cross-linked polyacetals in accordance with the invention can be simply produced cost-effectively on a large scale. In that connection especially through taking care of the cross-linking conditions and the necessarily short cross-linking times, oxidation reactions and/or other additional thermally induced reactions, which as a rule lead to coloration of the polymer and thus particularly for the application as transparent laminated safety glass, is a loss of quality that is to be avoided.

The manufacture of the cross-linked polyacetals in accordance with the invention can be carried out with care very quickly so that based on the high molecular weights of the polyvinylacetals, already at the beginning, very short extrusion distances or extrusion holding times can be selected.

Based on its characteristic property profile the polyvinylacetals in accordance with the invention are especially suitable for laminated safety glass which can be manufactured cost-effectively on a large scale in a simple way, especially by means of an extrusion process. Thereby in this connection above all the advantage to carry, that through use of the polyvinylcetals in accordance with the invention, blister formation as well as property fluctuations during the processing are as far as possible avoided and in this way laminated safety glasses with improved optical and mechanical properties, and better reproducibility, are feasible.

According to a first aspect the present invention relates to polyacetals which are obtainable from a polymer (A1), which in relation to its total weight, contain
(a) 1.0 to 99.9 wt % structural units of formula (1)

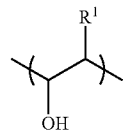

(1)

(b) 0 to 99.0 wt % structural units of formula (2)

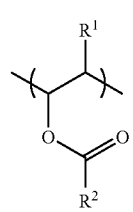

(2)

(c) 0 to 70.0 wt % of structural units of formula (3)

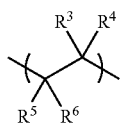
(3)

(d) 0.00001 to 30.0 wt %, preferably 0.1 to 30.0 wt %, structural units of formula (4a)

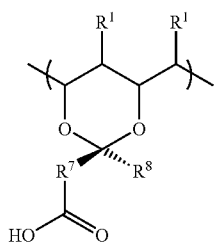
(4a)

Thereby the particular structural units differ naturally from each other, comprised especially in the framework of the present invention the structural unit of the formula (3) not the structural units of the formula (1), (2) and/or (4a).

The group $R^1$ represents, in each case independently of each other, hydrogen or methyl, preferably hydrogen.

The group $R^2$ identifies hydrogen or an alkyl group with 1 to 6 carbon atoms, preferably an alkyl group with 1 to 6 carbon atoms, suitably a methyl, ethyl, n-propyl, iso-propyl, n-butyl, sec-butyl, tert-butyl, n-pentyl, or an n-hexyl group, advantageously a methyl or an ethyl group, especially a methyl group.

The groups $R^3$, $R^4$, $R^5$, $R^6$ are in each case groups that are independent of each other with a molecular weight in the range from 1 to 500 g/mol, suitably hydrogen, an if necessary branched aliphatic or cycloaliphatic group with 1 to 16 carbon atoms, which if necessary can contain one or a plurality of carboxylic acid amides—and/or sulfonic acid groups.

The group $R^7$ is a linkage, an alkylene group with 1 to 10 carbon atoms or an if necessary substituted arylene group with 6 to 12 carbon atoms, suitably hydrogen or a methylene, ethylene, n-propylne, iso-propylene, n-butylene, sec-butylene, tert-butylene, n-pentylene, or an n-hexylene group, which can if necessary have one or a plurality of COOH groups as substituents.

The group $R^8$ represents hydrogen, a carboxyl group or an alkyl group with 1 to 10 carbon atoms or an if necessary substituted aryl group with 6 to 12 carbon atoms, suitably hydrogen or a methyl, ethyl, n-propyl, iso-propyl, n-butyl, sec-butyl, tert-butyl, n-pentyl, or an n-hexyl group, which can if necessary have one or a plurality of COOH groups as substituents. Specially preferred $R^8$ groups comprise hydrogen, a methyl group and —$CH_2COOH$.

Specially preferred structural units of formula (3) derive from straight chain or branched olefins with 2 to 18 carbon atoms, (meth)acrylamides and/or ethylenesulfonic aid. In this context olefins such as those with an end-positioned C—C double bond, which preferably has 2-6 carbon atoms, especially ethylene prove to be especially favorable. Furthermore structural units (3) which derive from acrylamidepropenyl-sulfonic acid (AMPS) lead in accordance with the invention to quite especially advantageous results.

Specially preferred structural units of formula (4) are obtainable by acetalization of structural units of formula (1) with glyoxalic acid.

In accordance with a second aspect the present invention relates to polyacetals which are obtainable from a polymer (A2), which contain in relation to its total weight,
(a) 1.0 to 99.9 wt % structural units of formula (1)
(b) 0 to 99.0 wt % structural units of formula (2)
(c) 0 to 70.0 wt % structural units of formula (3)

Thereby the particular structural units differ naturally from each other, comprised especially within the framework of the present invention, the structural unit of the formula (3) not the structural units of the formula (1), and/or (2).

Furthermore the groups $R^1$ to $R^6$ are defined as described earlier.

Relative to the composition of the polymers (A1) and/or (A2), the following is preferably applicable:

The total number of structural units of formula (2) is preferably in the range from 0.1 to 40 mol %, suitably in the range from 0.5 to 25.0 mol %, especially in the range from 1.0 to 15.0 mol %, in each case relative to the total number of structural units of the formula (1) and (2) Thereby, in accordance with a first preferred embodiment of the present invention, polymers (A1) and/or (A2) are employed, which relative to the total number of structural units of formula (1) and (2) contain 1.0 to 2.0 mol % structural units of formula (2). In accordance with a second preferred embodiment of the present invention polymers (A1) and/or (A2) are employed, which relative to the total number of structural units of formula (1) and (2) contain 3.0 to 7.0 mol % structural units of formula (2). In accordance with a third preferred embodiment of the present invention polymers (A1) and/or (A2) are employed, which relative to the total number of structural units of formula (1) and (2) contain 10.0 to 15.0 mol % structural units of formula (2).

In accordance with another preferred embodiment of the present invention the polymers (A1) and/or (A2) contain, in each case relative to the total weight, >50.0 wt %, suitably >60.0 wt %, advantageously >70.0 wt %, especially >80.0 wt % of structural units of formula (1) and/or (2). Especially advantageous results can be obtained thereby with polymers (A1) and/or (A2), which, in each case contain relative to their total weight >85.0 wt %, suitably >90.0 wt %, advantageously >95.0 wt %, especially >99.0 wt % of structural units of formula (1) and/or (2).

Within the scope of the present invention the polymers (A1) and/or (A2) possess a syndiotactic, isotactic and/or atactic chain structure. It an moreover be either a random or a block copolymer.

The viscosity of polymers (A1) and/or (A2) is in accordance with the invention of subordinate significance, in principle low as well as high molecular weight polymers (A1) and/or (A2) can be utilized. Nonetheless it has been shown within the framework of the present invention to be quite especially favorable that the polymers (A1) and/or (A2) have a viscosity in the range from 1 to 70 mPas, especially in the range from 2 to 40 mPas, especially in the range from 3 to 30 mPas (measured as a 4% aqueous solution according to Höppler at 20° C., DIN 53015).

Furthermore, the polymers (A1) and (A2) are not subject to any special limitations relative to their molecular weight, for the purposes of the present invention however polymers (A1) and/or (A2) have quite specially stood the test of a mid-range molecular weight of at least 20,000 g/mol. The mid-range molecular weight is preferably determined thereby by means of gel permeation chromatography, suitably using a polyethylene oxide calibration.

The manufacture of polymers (A1) and/or (A2) for use in accordance with the invention, can be carried out in a known way by means of a multi-stage method. In a first step the corresponding vinyl ester dissolved in a suitable solvent, as a rule water or an alcohol like methanol, ethanol, propanol and/or butanol is radically polymerized by use of a suitable radical starter. If the polymerization is carried out in the presence of radically copolymerizable monomers then one obtains the corresponding vinyl ester copolymers.

In a second step the vinyl ester (co)polymer is then saponified, conventionally by transesterfication with methanol, wherein the desired degree of saponificaton can be adjusted in a known way, for example by variation of the catalyst concentration, the reaction temperature and/or the reaction time. For further details refer to the current technical literature, in particular Ullmann's Encyclopedia of Industrial Chemistry, Fifth Edition on CD-ROM, Wiley-VCH, 1997, Keyword: Poly(VinylAcetals) and the references given therein.

Starting from the polyvinylalcohol obtained in this manner the polymers (A1) can then be obtained by esterification and acetalization with a compound if formula (4b),

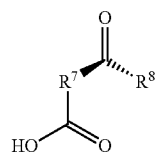

(4b)

wherein $R^7$ is a linkage, an alkyl group with 1 to 10 carbon atoms or an if necessary substituted arylene group with 6 to 12 carbon atoms and $R^8$ is hydrogen, COOH, an alkyl group with 1 to 10 carbon atoms or an if necessary substituted aryl group with 6 to 12 carbon atoms.

The reaction of polyvinylalcohol with the compound (4b) is preferably carried out in at least one inert solvent, wherein the term "inert solvent" holds for such a solvent, which under the particular reaction conditions does not disturb or even hinder the course of the desired reaction. An especially appropriate solvent in this connection is water.

Furthermore, the reaction may be carried out thereby in a favorable manner in the presence of acid catalysts. Suitable acids comprise in addition to organic acids such as for example acetic acid, mineral acids like hydrochloric acid, sulfuric acid and/or nitric acid, wherein the addition of hydrochloric acid, sulfuric acid and/or nitric acid has been especially proved in the art. Carrying out the reaction occurs in such a way that an aqueous solution is prepared of the polyvinyl alcohol, the compound (4b) is put into this solution and subsequently the acid catalyst is added drop-wise.

Within the framework of a first embodiment of the present invention the cross-linked polyvinylacetals are obtained, in which one in any sequence, (i) reacts polymer (A1) with at least one polyaldehyde of formula (5),

(5)

and (ii) at least partially, groups of formula (1) and of formula (4a) esterify with each other.

In that connection $R^9$ represents a linkage or a group having 1 to 40 carbon atoms, preferably an aliphatic, cycloaliphatic and/or aromatic group with suitably 1 to 20, preferably 1 to 12, especially 2 to 10 carbon atoms.

The index n is a whole number larger than 2, preferably in the range from 2 to 10, suitably in the range from 2 to 6, especially 2 or 3. In accordance with a quite specially preferred embodiment of the invention n equals 2.

In accordance with the invention quite especially suitable compounds of formula (5) comprise glyoxyl, propanedial, n-butanedial, glutardialdehyde, n-hexanedial, n-heptanedial, n-octanedial, n-nonanedial, n-decanedial, n-undecanedial, n-dodecanedial, 4,4'-ethylenedioxydibenzaldehyde and 2-hydrtoxyhexanedial, especially glutardialdehyde and n-nonanedial.

The amount of polyaldehyde (5) can within the framework of the present invention be in principle chosen at will, however it has been proven for the purposes of the present invention to be quite special to add 0.001 to 1.0 wt %, suitably 0.005 to 2.0 wt %, especially 0.01 to 1.0 wt % of polyaldehyde (5) in relation to the total polymer weight.

Carrying out of steps (i) and (ii) can be carried out in any order, that is it is possible to initially carry out step (i) and then step (ii) or first step (ii) and then step (i) or however both steps simultaneously. However for the purposes of the present invention it has been shown quite especially favorable to first carry out step (i) and then step (ii).

Within the framework of a quite specially preferred embodiment of the present invention, at any point in time, at least one compound of formula (6) is added.

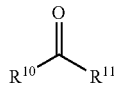

(6)

The groups $R^{10}$ and $R^{11}$ are independently of each other hydrogen, an alkyl group with 1 to 10 carbon atoms or an aryl group with 6 to 12 carbon atoms. In that connection, these alkyl and aryl groups can be substituted with one or a plurality of hydroxyl, sulfonic acid groups and/or halogen atoms, such as fluorine, chlorine, bromine or iodine. Formaldehyde, acetaldehyde, propionaldehyde, n-butyraldehyde, iso-butyraldehyde, iso-butyraldehyde, 2-ethoxybutyraldehyde, paraldehyde, 1,3,5-trioxane, capronaldehyde, 2-ethylhexanal, pelargonaldehyde, 3,5,5-trimethylhexanal, 2-formylbenzosulfonic acid, acetone, ethylmethylketone, butylethylketone and/or ethylhexylketone belong to the preferred compounds of formula (6).

Within the framework of the present invention the addition of aldehydes that is of compounds of formula (6) with $R^{10}$=hydrogen and $R^{11}$=hydrogen, a methyl, ethyl, n-propyl or an isopropyl group, preferably of formaldehyde and/or n-butyraldehyde, especially of n-butyradehyde have proved themselves quite especially.

The ratio of the components (5) and (6) is preferably chosen as follows
(1) 95.00 to 99.9 parts by weight at least of a compound (6)
(2) 0.01 to 5.0 parts by weight of at least one polyaldehyde (5), wherein the added parts by weight preferably round out to 100.00 parts by weight.

The reaction of polymer (A1) with the compound (5) and/or (6) is preferably carried out in at least one inert solvent, wherein the term "inert solvent" holds for such a solvent, which under the particular reaction conditions does not disturb or even hinder the course of the desired reaction. A particularly suitable solvent in this connection is water.

The reaction may furthermore be carried out in a favorable manner in the presence of acid catalysts. Suitable acids comprise in addition to organic acids such as for example acetic acid, mineral acids like hydrochloric acid, sulfuric acid and/or nitric acid, wherein the addition of hydrochloric acid, sulfuric acid and/or nitric acid has been especially proved in the art. Carrying out the reaction takes place preferably in such a way that an aqueous solution is prepared of polymer (A1), the compound (5) and/or (6) is put into this solution and subsequently the acid catalyst is added drop-wise.

Within the framework of a second embodiment of the present invention the cross-linked polyvinylacetals are obtained, in which one,
(i) reacts the polymer (A2) with at least one compound of formula (6),
(ii) adds at least one compound of formula (4b),
(iii) adds a polyaldehyde of formula (5), and
(iv) esterifies at least partially groups of formula (1) and structural units derived from the compound of formula (4b)
In that connection the compounds of formula (4b), (5) and (6) are defined as above.

The esterification (ii) and/or (iv) can be performed in a known way, wherein it has been shown within the framework of the present invention to be quite especially favorable to carry out the cross-linking thermally, if necessary in the presence of at least one softener, at bulk temperatures in the range from 80 to 280° C., preferably in the range from 120 to 280° C., and especially in the range from 140 to 260° C.

The thermal cross-linking of polyacetal can be carried out thereby with any heatable units known to the person skilled in the art, such as for example ovens, kneaders, extruders, presses or autoclaves. Preferably however thermal cross-linking is carried out in extruders or in kneading units, since these ensure a good homogenization with the softener(s) which is/are contained in a preferred embodiment. The cross-linking is thereby recognizable for that in comparison with the non cross-linked higher molecular weight of cross-linked polyacetal.

The degree of cross-linking can be freely chosen—according to the application. Nonetheless, within the framework of the present invention, it has been shown to be quite especially suitable that at least 10 mol %, preferably at least 20 mol %, suitably at least 30 mol %, especially at least 40 mol %, of all carboxyl groups contained originally in the polyvinylacetal be esterified. Thereby the carboxyl group content relative to the total weight of cross-linked polyacetal is preferably less than 10.0 wt % and lies preferably in the range from 0.00001 to 10.0 wt %, specially preferred in the range from 0.001 to 10.0 wt %, suitably in the range from 0.01 to 5.0 wt % and especially from 0.01 to 2.0 wt %.

The cross-linked polyvinylacetals in accordance with the invention contain softeners in a preferred embodiment. Any softener known to the person skilled in the art can be employed as a softener. The softener is thus added in the customary amount known to the person skilled in the art. Known softeners for polyvinylacetals, especially for polyvinylbutyrals are thereby the esters of aliphatic mono- and dicarboxylic acids with single or multivalent alcohols or oligoalkylene glycol ethers, phosphoric acid esters as well as various phthalates, such as are disclosed in this connction in for example U.S. Pat. No. 5,137,954. Preferably employed however are the diesters of di-, tri- and tetraethyleneglycols with aliphatic monocarboxylic acids, adipic acid-dialkyl ester as well as the dibenzoates of alkylene- and polyalkylene glycols described in the un-prepublished German Patent Application 101 00 681.

Possible addition areas of cross-linked polyvinylacetals in accordance with the invention are apparent to one skilled in the art. They are especially suited for all applications, which are indicated for cross-linked polyvinlacetals, especially for polyvinylformals and/or polyvinylbutyrals. Especially preferred application areas comprise their use as films, especially for laminated glasses, which can preferably be made by direct extrusion with the help of wide slit nozzles. Further details for the extrusion of polyvinylacetals and for the manufacture of polyvinylacetal—especially polyvinylutyral films, are sufficiently known to the person skilled in the art from the technical literature.

In the context of the present invention, a specially preferred application area for the polyvinylacetals in accordance with the invention are flat shapes, especially films, preferably with a thickness in the range from 0.5 µm to 1 mm. The films in accordance with the invention can thereby contain other usual additives, such as e.g. oxidation stabilizers, UV stabilizers, dyestuffs, filler materials, pigments and/or anti-adhesion agents.

Furthermore the polyvinylacetals in accordance with the invention are specially suited for the coating of substrates, especially wood, metal, plastic, glass, textiles, paper, and leather, as well as ceramic and mineral undercoats. The object of the present invention is therefore also coatings containing polyvinylcetals in accordance with the invention.

The coatings can moreover contain polymer resins, softeners, pigments, filler materials, stabilizers, adhesion promoters, rheological aids, additives that influence pH, and/or additives which catalyze chemical reactions between the polyvinylacetals in accordance with the invention and other polymer resins as well as between the other polymer resins and each other.

The coating in accordance with the invention can take place in a known way either as powder which preferably is subsequently melted at a higher temperature and cross-linked, or also from a preferably organic solution by means of coating methods known to a person skilled in the art. Thereby, in applying from solution, the polyvinylcetal to be cross-linked in accordance with the invention, if necessary together with other binding agents, as well as if necessary other ingredients, such as for example softeners, pigments, filler materials, stabilizers, adhesion promoters, rheological aids, dissolved in the solvent or solvent mixture is then preferably applied to the substrate to be coated. The cross-linking in accordance with the invention is preferably carried out after evaporation of the solvent, suitably at a temperature in the region of 20 to 200° C. Thereby the cross-linking reaction is favorably supported by pH-lowering additives, such as for example organic and/or inorganic acids.

In connection with its application in coatings the cross-linking becomes evident in an increase in the resistance to solvents as well as an increase of molecular weight, in the comparison with non cross-linked polyvinylcetal.

In accordance with another aspect of the present invention the polyvinylacetals in accordance with the invention are also especially suitable for the manufacture of ionically conductive intermediate layers for electrochromic systems.

The invention claimed is:
1. A method for the manufacture of cross-linked polyvinylacetals, said method comprising, in any sequence:
(i) reacting a polymer (A1) which contains in relation to its total weight

(a) 1.0 to 99.9 wt % structural units of formula (I)

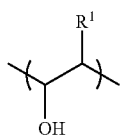
(1)

where $R^1$ represents hydrogen or methyl,
(b) 0 to 99.0 wt % structural units of formula (2)

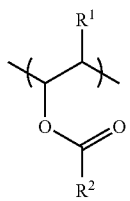
(2)

wherein $R^2$ represents hydrogen or an alkyl group with 1 to 6 carbon atoms,
(c) 0 to 70.0 wt % of structural units of formula (3)

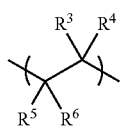
(3)

wherein $R^3$, $R^4$, $R^5$ and $R^6$, are in each case groups independent of each other with a molecular weight in the range from 1 to 500 g/mol, and
(d) 0.00001 to 30.0 wt % structural units of formula (4a)

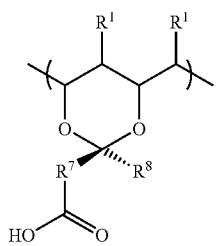
(4a)

wherein $R^7$ is a linkage, an alkylene group with 1 to 10 carbon atoms optionally substituted by one or more COOH groups, or an optionally substituted arylene group with 6 to 12 carbon atoms, and $R^8$ is hydrogen, COOH, an alkyl group with 1 to 10 carbon atoms and optionally substituted by one or more COOH groups, or an optionally substituted aryl group with 6 to 12 carbon atoms,
with at least one polyaldehyde of formula (5), $$R^9(CHO)_n \quad (5)$$

wherein $R^9$ represents a linkage or a group having 1 to 40 carbon atoms, and n is a whole number greater than 2; and (ii) at least partially esterifying groups of formula (1) and formula (4a) of polymer (A1) with each other.

2. The method according to claim 1, further comprising adding at any point in time at least one compound of formula (6),

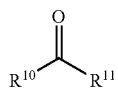
(6)

wherein $R^{10}$ and $R^{11}$ are each independently hydrogen, an alkyl group with 1 to 10 carbon atoms which is optionally substituted by one or more hydroxyl, sulfonic acid groups, halogen atoms, or combinations thereof, or an aryl group with 6 to 12 carbon atoms which is optionally substituted by one or more hydroxyl, sulfonic acid groups, halogen atoms, or combinations thereof.

3. The method according to claim 1, wherein $R^8$ is hydrogen.

4. The method according to claim 1, wherein $R^7$ is a linkage or an alkylene group with 1 to 4 carbon atoms.

5. A method for the manufacture of cross-linked polyvinylacetals, said method comprising:
(i) reacting a polymer (A2), which in relation to its total weight contains
(a) 1.0 to 99.9 wt % structural units of formula (1)

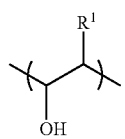
(1)

wherein $R^1$ represents hydrogen or methyl,
(b) 0 to 99.0 wt % structural units of formula (2)

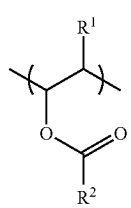
(2)

wherein $R^2$ represents hydrogen or an alkyl group with 1 to 6 carbon atoms, and
(c) 0 to 70.0 wt % of structural units of formula (3)

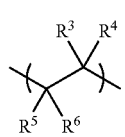
(3)

wherein $R^3$, $R^4$, $R^5$ and $R^6$, are in each case groups independent of each other with a molecular weight in the range from 1 to 500 g/mol,
with at least one compound of formula (6)

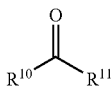

wherein $R^{10}$ and $R^{11}$ are each independently hydrogen, an alkyl group with 1 to 10 carbon atoms which is optionally substituted by one or more hydroxyl, sulfonic acid groups, halogen atoms, or combinations thereof, or an aryl group with 6 to 12 carbon atoms which is optionally substituted by one or more hydroxyl, sulfonic acid groups, halogen atoms, or combinations thereof, (ii) adding at least one compound of formula (4b)

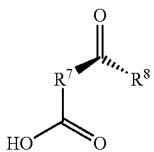

wherein $R^7$ is a linkage, an alkylene group with 1 to 10 carbon atoms optionally substituted by one or more COOH groups, or an optionally substituted arylene group with 6 to 12 carbon atoms and $R^8$ is hydrogen, COOH, an alkyl group with 1 to 10 carbon atoms and optionally substituted by one or more COOH groups, or an optionally substituted aryl group with 6 to 12 carbon atoms, (iii) a polyaldehyde added of formula (5), $$R^9(CHO)_n \qquad (5)$$

wherein $R^9$ is a linkage or a group having 1 to 40 carbon atoms and n is a whole number greater than 2, and (iv) at least partially esterifying groups of formula (1) and groups derived from structural units of formula (4b) with each other.

6. The method according to claim 5, wherein $R^8$ is hydrogen.

7. The method according to claim 5, wherein $R^7$ is a linkage or an alkylene group with 1 to 4 carbon atoms.

8. The method according to claim 1, wherein n is 2 or 3.

9. The method according to claim 1, wherein $R^9$ is an aliphatic, cycloaliphatic and/or aromatic group with 1 to 12 carbon atoms.

10. The method according to claim 9, wherein glutardialdehyde and/or n-nonanedial is utilized as compound (5).

11. The method according to claim 1, wherein n-butyraldehyde is employed as compound (6).

12. The method according to claim 1, wherein
(1) 95.00 to 99.99 parts by weight at least of one compound (6), and
(2) 0.01 to 5.00 parts by weight at least of a polyaldehyde (5) are added,
wherein the parts by weight given is based on 100.00 parts by weight of the total amount of compound (5) and compound (6).

13. The method according to claim 1, wherein esterification (ii) or (iv) is carried out in presence of at least one softener, at a temperature of from 80 to 280° C.

14. The method according to claim 13, wherein cross-linking is carried out in an extruder, kneading device or another heatable unit.

15. A cross-linked polyvinylacetal obtainable by a method in accordance with claim 1.

16. The polyvinylacetal in accordance with claim 15, wherein the carboxyl group content relative to the total weight of cross-linked polyacetal is less than 10.0 wt %.

17. The polyvinylacetal in accordance with claim 15, wherein said polyvinylacetal contains softeners.

18. A molding material containing a polyvinylacetal in accordance with claim 15.

19. A film containing a polyvinylacetal in accordance with claim 15.

20. A laminated safety glass containing a film according to claim 19.

21. A coating containing a polyvinylacetal in accordance with claim 15.

22. An ionically conductive intermediate layer for electrochromic systems comprising a polyvinylacetal in accordance with claim 15.

23. A method according to claim 1, wherein
$R^1$ is hydrogen or methyl;
$R^2$ is hydrogen, methyl, ethyl, n-propyl, iso-propyl, n-butyl, sec-butyl, iso-butyl, tert-butyl, n-pentyl, or n-hexyl;
$R^3$, $R^4$, $R^5$, and $R^6$ are each independently hydrogen, an optionally branched aliphatic or cycloaliphatic group having 1 to 16 carbon atoms which is optionally substituted by one or more carboxylic amide groups and/or one or more sulphonic acid groups,
$R^7$ is methylene, ethylene, n-propylene, iso-propylene, n-butylene, sec-butylene, tert-butylene, n-pentylene, or n-hexylene, in each case optionally substituted by one or more COOH groups; and
$R^8$ is hydrogen, or methyl, ethyl, n-propyl, iso-propyl, n-butyl, sec-butyl, iso-butyl, tert-butyl, n-pentyl, or n-hexyl, which in each case optionally substituted by one or more COOH groups.

24. A method according to claim 5, wherein
$R^1$ hydrogen or methyl; $R^2$ is hydrogen, methyl, ethyl, n-propyl, iso-propyl, n-butyl, sec-butyl, iso-butyl, tert-butyl, n-pentyl, or n-hexyl;
$R^3$, $R^4$, $R^5$, and $R^6$ are each independently hydrogen, an optionally branched aliphatic or cycloaliphatic group having 1 to 16 carbon atoms which is optionally substituted by one or more carboxylic amide groups and/or one or more sulphonic acid groups,
$R^7$ is methylene, ethylene, n-propylene, iso-propylene, n-butylene, sec-butylene, tert-butylene, n-pentylene, or n-hexylene, in each case optionally substituted by one or more COOH groups; and
$R^8$ is hydrogen, or methyl, ethyl, n-propyl, iso-propyl, n-butyl, sec-butyl, iso-butyl, tert-butyl, n-pentyl, or n-hexyl, which in each case is optionally substituted by one or more COOH groups.

25. A method according to claim 23, wherein $R^9$ is an aliphatic, cycloaliphatic and/or aromatic group having up to 20 carbon atoms, and n is a whole number from 2 to 10.

26. A method according to claim 24, wherein $R^9$ is an aliphatic, cycloaliphatic and/or aromatic group having up to 20 carbon atoms, and n is a whole number from 2 to 10.

27. A method according to claim 1, wherein the compound of formula (5) is glyoxyl, propanedial, n-butanedial, glutardialdehyde, n-hexanedial, n-heptanedial, n-octanedial, n-nonanedial, n-decanedial, n-undecanedial, n-dodecanedial, 4,4'-ethylenedioxydibenzaldehyde or 2-hydrtoxyhexanedial.

28. A method according to claim 2, wherein the compound of formula (6) is formaldehyde, acetaldehyde, propionaldehyde, n-butyraldehyde, iso-butyraldehyde, iso-butyraldehyde, 2-ethoxybutyraldehyde, paraldehyde, 1,3,5-trioxane, capronaldehyde, 2-ethylhexanal, pelargonaldehyde, 3,5,5-trimethylhexanal, 2-formylbenzosulfonic acid, acetone, ethylmethylketone, butylethylketone or ethylhexylketone.

29. A method according to claim 1, wherein
the compound of formula (5) is glyoxyl, propanedial, n-butanedial, glutardialdehyde, n-hexanedial, n-heptanedial, n-octanedial, n-nonanedial, n-decanedial, n-undecanedial, n-dodecanedial, 4,4'-ethylenedioxydibenzaldehyde or 2-hydrtoxyhexanedial, and
the compound of formula (6) is formaldehyde, acetaldehyde, propionaldehyde, n-butyraldehyde, iso-butyraldehyde, iso-butyraldehyde, 2-ethoxybutyraldehyde, paraldehyde, 1,3,5-trioxane, capronaldehyde, 2-ethylhexanal, pelargonaldehyde, 3,5,5-trimethylhexanal, 2-formylbenzosulfonic acid, acetone, ethylmethylketone, butylethylketone or ethylhexylketone.

30. A method according to claim 1, wherein the total number of structural units of formula (2) is from 0.1 to 40 mol %, relative to the total number of structural units of the formula (1) and (2).

31. A method according to claim 29, wherein the total number of structural units of formula (2) is from 0.5 to 25.0 mol %, relative to the total number of structural units of the formula (1) and (2).

32. A method according to claim 1, wherein polymer A1 contains, relative to the total weight, >50.0 wt %, of structural units of formula (1) and/or (2).

33. A method according to claim 5, wherein polymer A2 contains, relative to the total weight, >50.0 wt %, of structural units of formula (1) and/or (2).

34. A method according to claim 1, wherein polymer A1 has a viscosity in the range from 1 to 70 mPas.

35. A method according to claim 5, wherein polymer A2 has a viscosity in the range from 1 to 70 mPas.

36. A polyvinylacetal in accordance with claim 17, wherein said softeners are selected from diesters of di-, tri- and tetraethyleneglycols with aliphatic monocarboxylic acids, adipic acid-dialkyl ester, and dibenzoates of alkylene- and polyalkylene glycols.

37. A film according to claim 19, wherein said film further contains one or more additives selected from oxidation stabilizers, UV stabilizers, dyestuffs, filler materials, pigments and/or anti-adhesion agents.

38. A coating according to claim 21, wherein said coating further contains one or more additives selected from polymer resins, softeners, pigments, filler materials, stabilizers, adhesion promoters, rheological aids, additives that influence pH, and additives that catalyze chemical reactions between the polyvinylacetals and other polymer resins.

* * * * *

UNITED STATES PATENT AND TRADEMARK OFFICE
CERTIFICATE OF CORRECTION

| | | |
|---|---|---|
| PATENT NO. | : 7,511,096 B2 | Page 1 of 1 |
| APPLICATION NO. | : 10/542019 | |
| DATED | : March 31, 2009 | |
| INVENTOR(S) | : Papenfuhs et al. | |

It is certified that error appears in the above-identified patent and that said Letters Patent is hereby corrected as shown below:

Column 14, line 41 reads "$R^1$ hydrogen or methyl; $R^2$ is hydrogen, methyl, ethyl," should read --$R^1$ is hydrogen or methyl; $R^2$ is hydrogen, methyl, ethyl,--.

Signed and Sealed this

Nineteenth Day of January, 2010

David J. Kappos
*Director of the United States Patent and Trademark Office*